(12) United States Patent
Garland et al.

(10) Patent No.: US 6,198,800 B1
(45) Date of Patent: Mar. 6, 2001

(54) EXPOSURE CONTROL FOR DIGITAL RADIOGRAPHY SYSTEMS USING CHARGE BUILD-UP IN SENSOR ARRAY PIXELS

(75) Inventors: Harry T. Garland, Los Altos Hills; Gerald A. May, Saratoga, both of CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/153,937

(22) Filed: Sep. 16, 1998

(51) Int. Cl.[7] ........................................................ H04N 3/15
(52) U.S. Cl. .......................................... 378/98.7; 378/98.8
(58) Field of Search ................................... 378/98.2, 98.7, 378/108, 96, 97, 98.8, 114, 117

(56) References Cited

U.S. PATENT DOCUMENTS 5,194,736 * 3/1993 Meulengrugge et al. ........... 378/98.7
5,448,613 * 9/1995 Haendle et al. ..................... 378/98.7
5,937,027 * 8/1999 Thevenin et al. ................... 378/98.7

FOREIGN PATENT DOCUMENTS 0 817 472 A1 * 1/1998 (EP) .................................... 378/98.7

* cited by examiner

Primary Examiner—David P. Porta
(74) Attorney, Agent, or Firm—Fenwick & West LLP (57) ABSTRACT

The x-ray exposure of an image pixel array (202) is measured by assigning to certain pixels (209ep) of the array the task of measuring the level of exposure. A target set (209) of pixels from array (202) is selected and divided into a set of exposure pixels (209ep) and a set of image pixels (209ip). Both sets of pixels generate and collect electrical charges in proportion to the amount of x-ray exposure experienced by them. The charges collected by the exposure pixels (209ep) are continuously read out during the capture of an image and compared with a desired exposure level. Once the desired exposure level is reached, as indicated by the exposure pixels (209ep), the image pixels (209ip) are read out and an image is produced.

24 Claims, 5 Drawing Sheets

FIG. 3 (PIXEL 300)

EXPOSURE CONTROL FOR DIGITAL RADIOGRAPHY SYSTEMS USING CHARGE BUILD-UP IN SENSOR ARRAY PIXELS

RELATED APPLICATIONS

The subject matter of this application is related to U.S. patent application Ser. No. 09/154,534 entitled "EXPOSURE COMPENSATION FOR DIGITAL RADIOGRAPHY SYSTEMS," filed Sep. 16, 1998 on by Harry T. Garland and Gerald May, and U.S. patent application Ser. No. 09/154,179 entitled "EXPOSURE COMPENSATION FOR DIGITAL RADIOGRAPHY SYSTEMS USING SPATIAL LOOK-UP TABLES", filed Sep. 16, 1998 on by Harry T. Garland and Gerald May.

TECHNICAL FIELD

This invention pertains to exposure control for digital radiography systems, and more particularly, to limiting the exposure of sensor array pixels to predetermined levels.

BACKGROUND ART

One task facing radiographers using conventional radiographic techniques (e.g., x-ray film) is to control the amount of exposure of the photographic film or plate. Specifically, during an examination, the total amount of x-rays passing through the patient's body part and striking the film or plate determines whether the film or plate is under, over, or properly exposed.

Typically, one of two techniques is used for controlling the exposure of an x-ray film or plate to an x-ray field. In the first, an ionization chamber is placed between the body part and the film. As the x-rays exit the body, they pass through the chamber before striking the film. The passage of the x-rays through the gas in the chamber produces an electrical charge proportional to the sum of the x-ray exposure. Once a level of charge indicative of the proper amount of exposure has been reached, the exposure is terminated. This technique, however, measures the exposure over the totality of the chamber and does not allow for localized exposure measurements. Thus, if a precise image of an area significantly smaller than that of the chamber is required, multiple images may have to be taken in order to correctly expose the localized area.

In the second commonly used technique for controlling levels of x-ray exposure, a photo cell is used to measure the accumulated x-ray exposure over a portion of an x-ray film or plate. Since only a portion is measured, accurate imaging of localized body parts is much easier to achieve than by use of an ionization chamber. After passing through the patient and the film, x-rays strike the photo cell where they produce an electrical charge in proportion to their intensity. Since, however, a photo cell is limited in the area it may measure, the body part in question must be carefully positioned between the source of the x-ray field and the cell. If the body part does not completely block the photo cell from raw x-rays, the exposure will terminate prematurely. As a result, it is very difficult to properly capture x-ray images of body parts positioned near the edge of the patient's body using the photo cell technique. In addition, since the photo cell is a separate unit from that of the x-ray plate, the cell must be properly aligned and positioned before it can produce a meaningful measurement.

Recently, digital radiography systems have begun to replace conventional x-ray systems. Digital radiography systems provide high quality radiographs by capturing x-ray images with a sensor plate having a matrix of silicon detectors. The x-ray images can be transmitted to a diagnostic viewer or any other output device, or to any other location via, for example, an Ethernet interface.

The sensor plate provides several advantages over conventional x-ray film. For example, unlike conventional x-ray film, digital images can be produced and viewed within a few seconds of x-ray exposure. Moreover, the sensor plate used in digital systems can capture most patient imaging areas with high resolution (e.g., 160×160 microns pixel size, with 4096 gray scale (12 bit) contrast). The sensor plate also covers a larger dynamic range than conventional x-ray film.

Like conventional x-ray film, digital radiography systems require techniques for controlling the level of x-ray exposure experienced by the digital sensor plate. Currently, digital radiography must make do with the conventional x-ray system techniques and the associated problems discussed above. It is desirable therefore to have a system and method for accurately controlling a localized level of exposure, without having to precisely position the patient and the measuring device.

DISCLOSURE OF THE INVENTION

The present invention pertains to the measurement of x-ray exposures and the capture of x-ray images for digital radiography systems. A target set (209) of pixels from an array (202*b*) of sensor unit pixels located in a digital radiography system (100) is selected and divided into a set of exposure pixels (209*ep*) and a set of image pixels (209*ip*). Both sets of pixels generate and collect electrical charges in proportion to the amount of x-ray exposure experienced by them. The charges collected by the exposure pixels (209*ep*) are continuously read out during the capture of an image and compared with a desired exposure level. Once the desired exposure level is reached, as indicated by the exposure pixels (209*ep*), the image pixels (209*ip*) are read out and an image is produced. Significantly, the target set of pixels may be uniquely determined for each image taken, allowing for localized exposure control.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
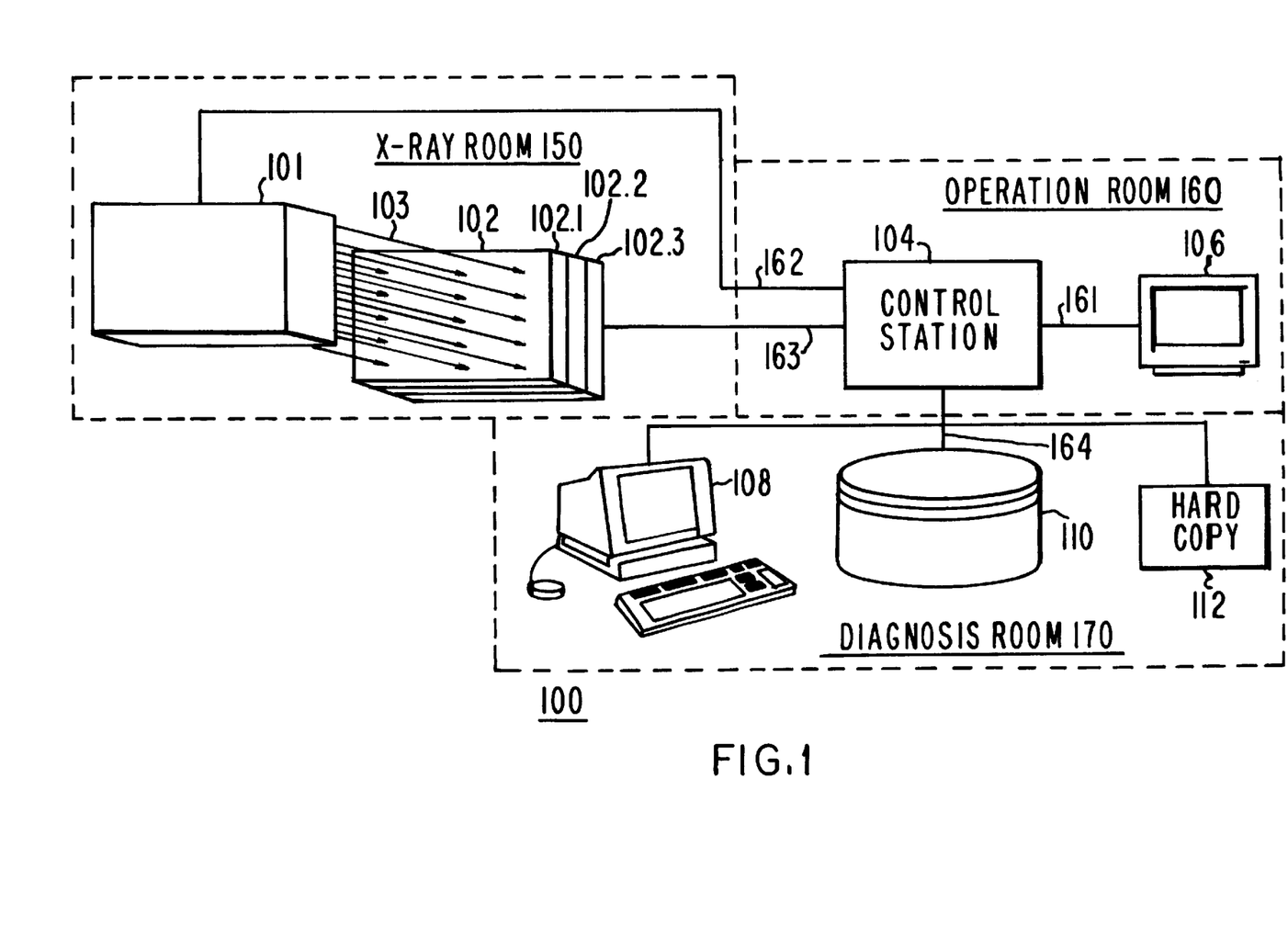
FIG. 1 is an illustration of one embodiment of a digital radiography system in accordance with the present invention.

Referring to FIG. 1, there is shown a functional diagram illustrating one embodiment of a digital radiography system 100 in accordance with the present invention. The elements of the system are typically distributed in two or three rooms for reasons of safety and efficiency. X-ray room 150, in which a patient is x-rayed, contains x-ray source 101 and sensor unit 102. The x-ray source and sensor unit are aligned such that x-rays 103 generated by the source will strike the sensor unit. Located in operation room 160, from which a radiologist supervises the operations of the equipment in the x-ray room, are control station/computer processor 104 and operation panel 106. Viewing workstation 108, image archiver 110, and hard copy output device 112 can also reside in the operation room, although they are typically situated in a separate diagnosis room 170, where completed x-ray images can be viewed and a diagnosis made.

During testing, a patient is situated between x-ray source 101 and sensor unit 102 by a radiologist. Depending on the nature of the inquiry, a full or partial body x-ray image may be desired. While the patient is so positioned, the radiologist transmits imaging parameters to control station 104 via operation panel 106 and communication channel 161. The imaging parameters typically include an indication of the target area to be x-rayed and the optimal x-ray exposure level for properly imaging the body part in question. The optimal level is either selected by the radiologist from a set of levels which have been predetermined for different body parts during the initial installation and calibration of the system, or determined by taking a calibration exposure of the patient prior to the actual imaging. Calibration exposures are discussed in further detail below.

Once the parameters have been received by station 104, the radiologist initiates the imaging with a start command transmitted over channel 161. Upon reception of this command, the control station assumes control of x-ray source 101 and sensor unit 102. Using communication channel 162, the station instructs the x-ray source to generate an x-ray field of a uniform strength. The generated x-rays propagate through the body part before impinging the sensor unit. The sensor unit continuously measures the amount of x-rays reaching it and passes the measurements through communication channel 163 to the station for comparison with the desired level. Once the proper level has been reached, the station instructs the x-ray source to discontinue the generation of x-rays. The image is then read out by the station from the sensor unit and passed through communication channel to 164 for archiver 110 for storage. From there it can be reproduced at workstation 108 or on paper by hard copy output 112. A diagnosis, if any, is then made.

Sensor unit 102 includes three layered elements. From the perspective of x-ray source 101 the layers are ordered as follows: protective covering 102.1, scintillator 102.2, and sensor plate 102.3. The protective covering protects the two other layers from damage. The scintillator converts x-rays, which have been produced by the x-ray source and passed through the body part, into an electromagnetic radiation, which is typically visible light. Throughout the remainder of this discussion, light and electromagnetic radiation fields are interchangeable.

Figure 2:
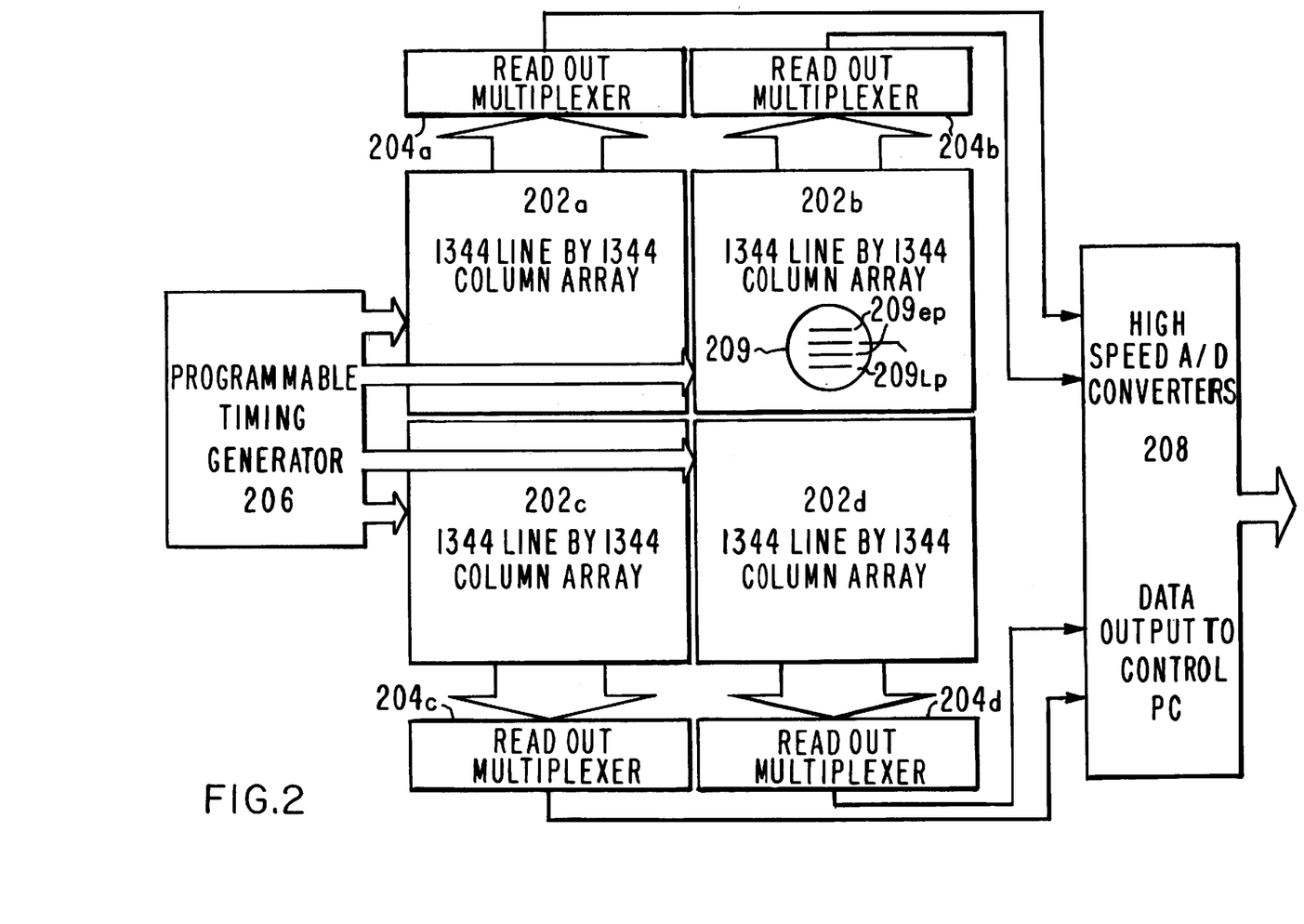
FIG. 2 is a functional block diagram illustrating one embodiment of sensor plate 102.3 of FIG. 1 in accordance with the present invention.

Sensor plate 102.3 includes an array of sensor unit pixels for measuring levels of x-ray exposure and for capturing x-ray images. Referring to FIG. 2, there is shown a functional block diagram illustrating one embodiment of sensor plate 102.3 in accordance with the present invention. The plate preferably includes sensor arrays 202a–d, read out multiplexers 204a–d, programmable timing generator 206, and analog-to-digital (A/D) converter 208. Alternatively, generator 206 may be configured as a separate unit attached to the sensor plate. Each sensor array can be, for example, an 8½ square inch rectangular matrix of amorphous silicon photo pixels. The pixels can be arranged in 1,344 lines and 1,344 columns. The sensor arrays 202a–d can be tiled together to form a larger 17 square inch matrix having 2,688 lines and 2,688 columns. This larger sensor array can provide a wide imaging size (e.g., 2,688×2,688 pixels; over 7 million microns) and high resolution (e.g., 160×160 microns pixel size, with 12 bit (4096 gray scale) contrast). It is noted that the present invention is not limited to the configuration in FIG. 2, and other configurations are possible for reading pixel values and converting them to digital representations.

As light from scintillator 102.2 strikes sensor plate 102.3, an electrical charge builds up in each pixel struck. Significantly, the amount of charge is proportional to the intensity of light and x-rays received. Thus over a period of time, the amount of charge accumulated is proportional to the total x-ray exposure over the same period. Since most body parts are composed of various organic matter such as fluid, bone, cartilage, and soft tissue, the x-ray field striking the sensor unit will not be uniform. This non-uniformity is reflected in the distribution of charges among the pixels. For example, organic matters which absorb relatively large amounts of x-rays will allow only a relatively small amount of x-rays to pass through and strike sensor unit 102. As a result, the pixels struck will produce and retain relatively little amounts of charge. Conversely, organic matters which absorb relatively small amounts of x-rays will cause the corresponding pixels to capture relatively large amounts of charge. The contrast between the large and small amounts of charge make possible the production of an image, while the proportional relationship between the x-rays received and the electrical charges produced is useful for determining the level of x-ray exposure.

Figure 3:
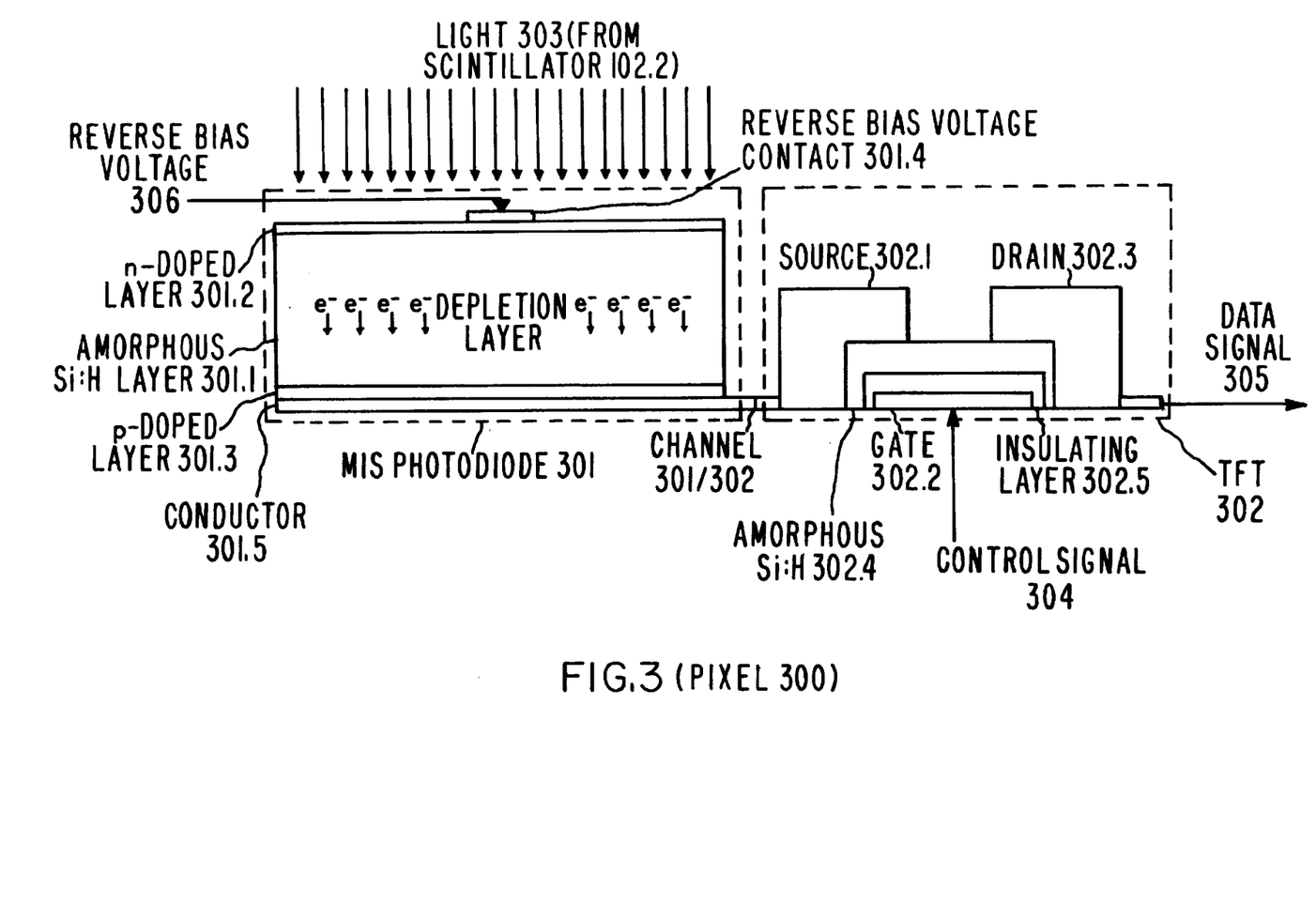
FIG. 3 is an illustration of one embodiment of a pixel from sensor array 202 of FIG. 2 in accordance with the present invention.

Shown in FIG. 3 is a cross section of photoelectric sensor pixel 300 in accordance with the present invention. Pixel 300 comprises metal-insulator-semiconductor (MIS) photodiode 301 connected to field effect /thin film transistor (TFT) 302 by channel 301/302. In operation, an electromagnetic field, such as light 303, from scintillator 102.2 strikes MIS photodiode 301, which produces and stores an amount of electrical charge proportional to the amount of impinging light. After a predetermined period of time has expired, control signal 304 instructs TFT 302 to allow the accumulated electrical charge to pass from the pixel as data signal 305.

MIS photodiode 301 comprises a layer of intrinsic hydrogenated amorphous silicon (a-Si:H) 301.1 sandwiched between a layer of n-doped a-Si:H 301.2 and a layer of p-doped a-Si:H 301.3. Photodiode 301, shown with the n-doped layer facing the scintillator, is operative when positioned with either the n-doped or p-doped layers facing that direction. In addition to the sandwiched layers of amorphous silicon, photodiode 301 comprises a reverse bias voltage contact 301.4 positioned between the n-doped layer and the scintillator, and a layer of electrical conductor 301.5 positioned under the p-doped layer and leading to source 302.1 of TFT 302. In one embodiment of the invention, conductor 301.5 is comprised of chromium.

During the operation of pixel 300, a positive DC (direct current) voltage is placed on contact 301.4 in order to reverse bias the three silicon layers. This voltage, reverse bias voltage 306, creates a capacitance across the layers due to the attraction of electrons in the n-doped layer and the repulsion of holes in the p-doped layer to the positive voltage. As light is generated by scintillator 102.2 in response to x-rays produced by source 101, they strike the silicon layers of MIS photodiode 301. A proportional number of electrons are thereby set loose from their silicon atoms. The freed electrons cross depletion layer 301.01 and collect on conductor 301.5. As a result, the reverse bias capacitance is diminished.

TFT 302 comprises source 302.1, gate 302.2, and drain 302.3. Channel 302.4 (comprised of a-Si:H) and a layer of insulating material 302.5 are positioned between the source and gate, and between the gate and drain. Control signal 304 is received by the pixel on gate 302.2, while data signal 305 is read from the pixel on drain 302.3. When control signal 304 is at a negative voltage, channel 302.4 is pinched off, preventing the electrons collected on conductor 301.5 from escaping. As control signal 304 approaches a neutral voltage, the channel opens and allows the trapped electrons to pass through the TFT as data signal 305.

Figure 4:
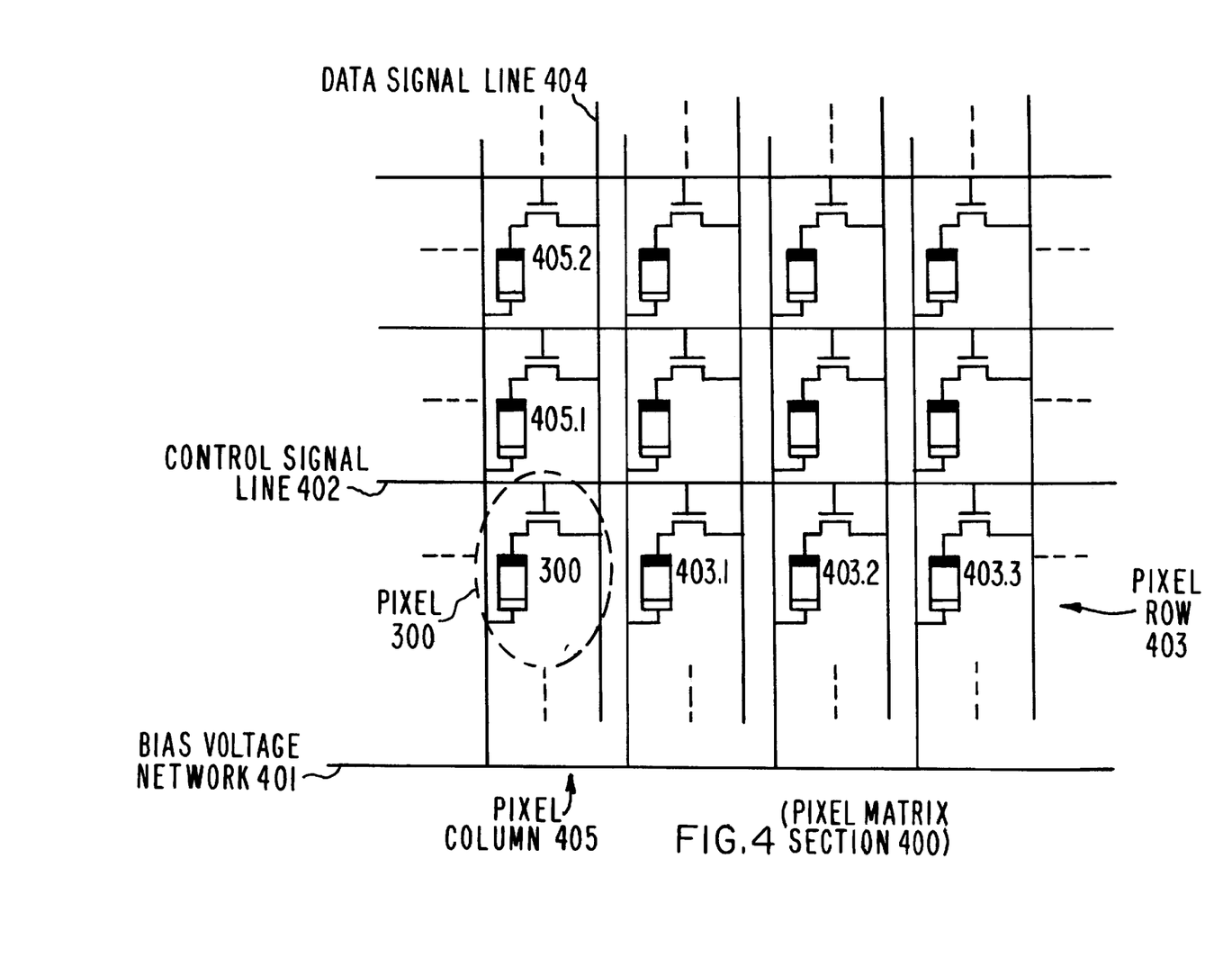
FIG. 4 is an illustration of a set of pixels from sensor array 202 in FIG. 2 in accordance with the present invention.

Shown in FIG. 4 is pixel matrix section 400 comprising four columns and three rows of pixels, among which is pixel 300. Section 400 is located on one of sensor arrays 202a–d and falls within a target area such as area 209. Each pixel in section 400 is structured in a manner similar to that shown in FIG. 3. Shown over the pixel array are bias voltage network 401 for conveying a bias voltages to the pixels, control signal lines 402, 406, and 407 for transmitting control signals to the pixels on a row-by-row basis, and data signal lines 404, 408, 409, and 410 for reading data from the pixels on a row-by-row basis. Bias voltage network 401 is connected to the bias voltage contact 301.4 of each pixel and supplies a common DC bias voltage to each pixel. For example, network 401 is shown connected to the bias voltage contact of pixel 300 as well as similar contacts for all of the pixels in the array. Each gate 302.2 of a given pixel row is connected to a common control signal line, while each drain 302.3 in a given pixel column is connected to a common data line. For example, control signal line 402 is connected to each of the control gates of pixel row 403 (pixels 300, 403.1, 403.2, and 403.3), while data signal network 404 is tied to each of the drains of pixel column 405 (pixels 300, 405.1, and 405.2).

As light hits matrix section 400, electrical charge is produced and held in each pixel while the respective gate voltages are held low by control signal lines 402, 406, and 407. The control signals are then synchronized to produce continuous data read outs on a row-by-row basis. The charge collected by each row is read out in parallel by selectively throwing the respective control signals high. For example, data from row 403 is read out by switching signal line 402 from low to high. Data from pixels 300, 403.1, 403.2, and 403.3 are then read out in parallel from data lines 404, 408, 409, and 410. The data is then passed to the read-out multiplexer 204 associated with the array.

Read out multiplexers 204a–d are coupled to A/D converter 208 for converting the analog data values from each pixel in the row to a digital representation. Each of the read out multiplexers 204a–d can be coupled to its own A/D converter 208, or alternatively, each read out multiplexer 204a–d can be further multiplexed to share one or more A/D converters. Each sensor array 202a–d can be coupled to a plurality of multiplexers to provide additional flexibility in reading individual rows in sensor arrays 202a–d.

Once the analog charges have been converted to digital representations, they can be used either for exposure measurement or for image generation. In accordance with an embodiment of the present invention, the sensor unit performs both functions by simultaneously measuring levels of exposure and capturing an image. This is accomplished by assigning the task of measuring the level of x-ray exposure to some pixels, while the remainder are used to capture an image. The chief distinction between the two classes of pixels is one of timing: an exposure pixel is read out by station 104 several times during the capturing of a single x-ray image, while an image pixel is read out only after the x-ray is complete.

The selection of a set of pixels for exposure measurement is typically performed by control station 104. Included in the imaging parameters entered by the radiologist are the coordinates, as measured against sensor unit 102, of the body part to be imaged. The control station maps these coordinates onto a set of target pixels, such as those in area 209, which are to receive x-rays propagated through the body part in question. The target set can include all of the pixels of the sensor unit, as can be required by a full-body image, or a subset of pixels, such as required for a wrist or other body part.

Once the target pixels have been determined, the control station divides them into exposure rows and image rows. Any number of algorithms can be used to calculate the number of exposure pixels, and thus exposure rows, required. In one embodiment, the ratio of exposure pixels to image pixels is determined by calculating an acceptable signal to noise ratio. For example, if the exposure rows comprise 10% of the target pixels, then the resulting image will have a signal to noise ratio that is approximately 90% of the ratio for an image generated by a pixel array that consists solely of image pixels. Thus, if this is an acceptable loss in signal to noise ratio, 10% of the target pixels can be devoted to exposure measurement. This 10% is typically distributed evenly, on a row-by-row basis, over the target pixels.

In a second embodiment, the data outputs for each exposure pixel are accumulated in a register or memory until the imaging is complete. Once complete, the accumulated values are reinserted into the final image stored in archiver 110. Thus, no data is lost and the signal to noise ratio is equal to that of an image generated by a pixel array that consists solely of image pixels. In this scenario, the number of exposure pixels can be chosen by the user with no effect on image quality. As in the first embodiment, the exposure pixels are typically distributed evenly, on a row-by-row basis, over the target pixels.

In addition to assigning each pixel the task of capturing the image or measuring exposure, a charge equivalent is calculated. The charge equivalent is the amount of electrical charge generated by a single pixel in response to a known amount of x-ray. Typically, this value is a system constant and can therefore be measured during system installation and reassessed on a regular basis. In making the determination, the pixel array is exposed to a known amount of x-ray. The resulting charge produced by the pixels are measured. The charge equivalent, typically expressed as a digital number, is then calculated by dividing the amount of charge measured by the amount of x-ray used to produce the charge. Since each pixel, for purposes of calculation, is identical to all others in the array, the calculated charge equivalent is the same for each pixel in the array.

Figure 5:
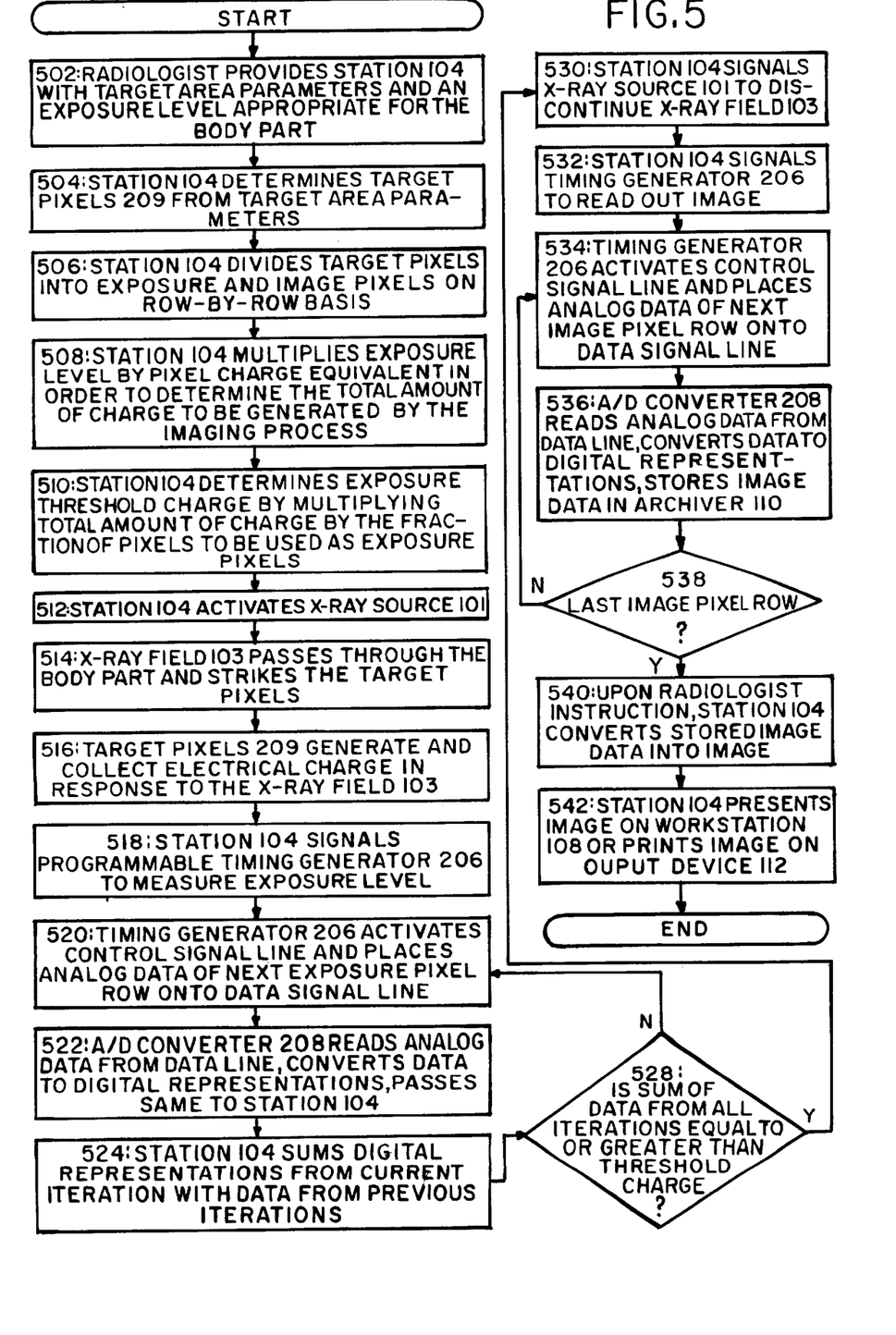
FIG. 5 is a flow diagram of a method of digital radiography in accordance with the present invention.

Shown in FIG. 5 is a flow diagram of an x-ray imaging and exposure measuring method in accordance with the present invention. In step 502, the radiologist provides control station 104 with the target area parameters (which, for example, can be expressed as two-dimensional coordinates) and an exposure level appropriate for the body part in question. In step 504, station 104 maps the target area parameters onto the pixel array and determines which pixels fall within the area. These pixels are the target set of pixels. In step 506, station 104 divides, on a row-by-row basis, the target set into sets of exposure and imaging pixels as described above.

In step 508, control station 104 multiplies the exposure level from step 502 by the predetermined pixel charge equivalent in order to determine the total amount of charge to be generated by the imaging process. In step 510, station 104 multiplies the charge total by the fraction of target pixels to be used as exposure pixels, thus producing an exposure threshold charge.

Once the target area has been divided into exposure and image pixels and the threshold charge determined, actual x-raying can begin. In step 512, x-ray source 101 is then turned on by station 104. In step 514, x-ray field 103 passes through the body part in question and strikes the target pixels. In step 516, the target pixels produce and store an electrical charge proportional and in response to the x-ray field. This process is described above in FIG. 3. In step 518, station 104 instructs timing generator 206 to continually measure the exposure level until the produced charge is equal to or greater than the threshold charge.

In step 520, the timing generator initiates the measurement of x-ray exposure by enabling the release of electrical charge from a first row of exposure pixels. As described above in FIG. 4, this is performed by raising the control signal from low to high. In step 522, an A/D converter, such as converter 208, reads the freed electrical charge as an analog data signal, converts the signal to a digital representation, and passes the representation to station 104. Station 104, in step 524, stores the representation in a local register (not shown). This register contains the sum of charge representations from all prior exposure read outs of the present measurement. In step 528, station 104 compares the contents of the register with the threshold charge. If the sum of all charge representations in the present measurement is less than the threshold charge, another iteration of steps 520 through 528 is performed with the next row of exposure pixels.

Steps 520–528 are reiterated until the summation of the charges the exposure row is equal to or greater than the threshold charge. Typically, therefore, the exposure rows must be read out a number of times before the target pixels have been properly exposed. This is possible, since each row of pixels in sensor arrays 202a–d takes substantially less time to read out (e.g., 80 μsec/row) than the total exposure time of the body part, which typically is measured in hundreds of milliseconds.

Once the sum of digital representations of the exposure pixel charges is equal to or greater than the threshold value, control station 104, in step 530, signals x-ray source 101 to discontinue the generation of x-rays. In step 532, station 104 instructs timing generator 206 to read out the image from the image pixels. In step 534, timing generator 206 reads out the next row of image pixels by asserting the respective control signal. The resulting analog signals are converted, in step 536, to digital representations by an A/D converter, such as converter 208. The digital representations are then mapped into archiver 110 on a pixel-by-pixel basis. In step 538, it is determined whether the last row of image pixels has been read out. If not, steps 534 through 538 are repeated for the next row. Once stored in archiver 110, the image, in step 542, is presented on workstation 108 or printed out on output device 112 by converting each stored charge representation to a corresponding color attribute, such as a color or color scale. Alternatively, the image can be displayed or printed, in the same manner, using a gray scale.

It is noted that since the charges accumulated by the exposure pixels are continually read out during the capture of an image, any remaining charges will not accurately reflect the complete exposure of these pixels over the period of the imaging. As a result, an uncompensated image will contain blank lines corresponding to the exposure rows. This effect can be countered in several ways. For example, each exposure pixel can be assigned to a register in station 104 for the duration of the imaging process. Each register stores a running summation of the digital equivalents of the charge generated by the corresponding pixel. Once the imaging is complete, the contents of the accumulators are inserted into the exposure pixel slots of the image data stored in archiver 110.

A second method for compensating for exposure pixel charge is to interpolate the digital representations from the representations of the surrounding image pixels. This can be performed by simple averaging of the surrounding values. A third method uses both interpolation and accumulators.

It is further noted that exposure pixels allow for the use of calibration exposures. As discussed above, the desired level of exposure for a given body part can be determined at the time of installation. Typically, this requires dedicating a period of time for the sole purpose of calibrating the imaging system and produces rough estimates at best. Alternatively, a test dose of x-rays of a known quantity can be generated by x-ray source 101 and passed through the body part of the patient in question. By noting the level of x-ray exposure received by the target pixels of sensor unit 102, the radiologist can quickly determine the level of exposure required to properly produce an image.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for controlling the exposure of at least one image pixel and at least one exposure pixel to an electromagnetic field, said method comprising:

continuously generating, in relation to the intensity of the exposure of the at least one exposure pixel to the electromagnetic field, at least one exposure electrical charge;

continuously generating a sum of the at least one exposure electrical charge;

determining whether the sum is not less than a predetermined limit;

in response to a determination that the sum is not less than the predetermined limit, discontinuing the exposure;

after discontinuing the exposure, reading out image data from the at least one image pixel;

determining when a last row of image pixels has been read; and in response to a determination that the last row of image pixel has been read, converting the image data into an image.

2. The method of claim 1 further comprising:

continuously generating, in relation to the intensity of the exposure of the at least one image pixel to the electromagnetic field, at least one image electrical charge; and in response to a determination that the sum is not less than the predetermined limit, generating at least one image attribute from the at least one image electrical charge.

3. The method of claim 2, wherein the electromagnetic field comprises visible light.

4. The method of claim 2, wherein the predetermined limit is associated with a user-supplied level of exposure.

5. The method of claim 2, wherein the at least one exposure pixel and the at least one image pixel are disposed on an electromagnetic sensor plate.

6. The method of claim 5, further comprising:

generating an x-ray field from an x-ray source;

absorbing a portion of the x-ray field with an object positioned between the source and the sensor plate; and generating the electromagnetic field from a non-absorbed portion of the x-ray field.

7. The method of claim 6, wherein the step of generating at least one image attribute further comprises:

converting an image electrical charge from the at least one image electrical charge to a first numerical quantity indicative of a first image attribute;

mapping the first numerical quantity into a pixel mapping; and rendering the first image attribute in accordance with the mapping.

8. The method of claim 7, wherein the step of mapping further comprises:

interpolating a numerical approximation from the numerical quantity, such that the approximation is indicative of a corresponding second image attribute;

mapping the numerical approximation into the pixel mapping; and rendering the second image attribute in accordance with the mapping.

9. The method of claim 7, wherein the step of mapping further comprises:

converting the sum to a second numerical quantity indicative of a corresponding second image attribute;

mapping the second numerical quantity into the pixel mapping; and rendering the second image attribute in accordance with the mapping.

10. The method of claim 6, further comprising:

rendering an image, corresponding to a portion of the object, from the at least one image attribute.

11. A system for controlling the exposure of at least one image pixel to an electromagnetic field, said system comprising:

at least one exposure pixel configured to continuously generate, in relation to the intensity of the exposure of the at least one exposure pixel to the electromagnetic field, at least one exposure electrical charge;

coupled to the at least one exposure pixel, a processor for continuously generating a sum of the at least one exposure electrical charge, wherein the processor is configured to determine whether the sum is not less than a predetermined limit and, in response to a determination that the sum is not less than the predetermined limit, discontinue the exposure; after discontinuing the exposure, read out image data from the at least one image pixel; determine when a last row of image pixels has been read; and in response to a determination that the last row of image pixel has been read, convert the image data into an image.

12. The system of claim 11 wherein:

the at least one image pixel is configured to continuously generate, in relation to the intensity of the exposure of the at least one image pixel to the electromagnetic field, at least one image electrical charge; and the processor is configured to generate, in response to a determination that the sum is not less than the predetermined limit, at least one image attribute from the at least one image electrical charge.

13. The system of claim 12, wherein the electromagnetic field comprises visible light.

14. The system of claim 12, wherein the predetermined limit is associated with a user-supplied level of exposure.

15. The system of claim 12, wherein the at least one exposure pixel and the at least one image pixel are disposed on an electromagnetic sensor plate.

16. The system of claim 15, further comprising:

an x-ray source for generating an x-ray field;

an object positioned between the source and the sensor plate for absorbing a portion of the x-ray field; and a scintillator positioned between the object and the sensor plate for generating the electromagnetic field from a non-absorbed portion of the x-ray field.

17. The system of claim 16, wherein the processor is configured to:

convert an image electrical charge, from the at least one image electrical charge, to a first numerical quantity indicative of a corresponding first image attribute;

map the numerical quantity into a pixel mapping; and render the first image attribute in accordance with the mapping.

18. The system of claim 17, wherein the processor is further configured to:

interpolate a numerical approximation from the numerical quantity, such that the approximation is indicative of a corresponding second image attribute;

map the numerical approximation into the pixel mapping; and render the second image attribute in accordance with the mapping.

19. The system of claim 17, wherein the processor is further configured to:

convert the sum to a second numerical quantity indicative of a corresponding second image attribute;

map the second numerical quantity into the pixel mapping; and render the second image attribute in accordance with the mapping.

20. The system of claim 16, wherein the processor is configured to render an image, corresponding to a portion of the object, from the at least one image attribute.

21. A system for controlling radiation ray quantity, comprising:

a sensor unit including a plurality of pixels that detects radiation-ray from a radiation-ray source through an object; and coupled to the sensor unit, a processor that controls said radiation-ray source on the basis of a signal from said pixel included in said sensor unit to discontinue the generation of radiation-ray and forms an image on the basis of signals from a plurality of pixels including said pixel used for controlling said radiation-ray source.

22. A system according to claim 21 wherein said sensor unit includes a scintillator and sensor plate.

23. A system according to claim 21 wherein said sensor unit includes a plurality of sensors, and wherein each of said plurality of sensors includes a plurality of pixels.

24. A method for controlling radiation ray quantity, comprising:

detecting radiation-ray from a radiation-ray source through an object;

controlling said radiation-ray source on the basis of a signal from a pixel to discontinue the generation of radiation-ray; and forming an image on the basis of signals from a plurality of pixels including said pixel used for controlling said radiation-ray source.

* * * * *